United States Patent [19]
Bellanger

[11] Patent Number: 5,495,507
[45] Date of Patent: Feb. 27, 1996

[54] FILTER ARRANGEMENT IMPLEMENTING A LEAST SQUARES METHOD UTILIZING ROTATION MATRICES

[75] Inventor: Maurice Bellanger, Paris, France

[73] Assignee: U.S. Philips Corporation, New York, N.Y.

[21] Appl. No.: 146,378

[22] Filed: Oct. 29, 1993

[30] Foreign Application Priority Data

Nov. 4, 1992 [FR] France ................................. 92 13243

[51] Int. Cl.$^6$ ..................................................... H04B 1/10
[52] U.S. Cl. .......................... 375/350; 375/343; 370/123; 455/213
[58] Field of Search ..................................... 375/350, 229, 375/343, 346; 370/123, 72; 455/213, 285, 296, 299, 307, 339

[56] References Cited

U.S. PATENT DOCUMENTS 3,969,674  7/1976  Tracey ......................................... 325/42
4,137,532  1/1979  Taylor, Jr. ................................. 343/7.7

FOREIGN PATENT DOCUMENTS 0546596  6/1993  European Pat. Off. ...... G06F 15/347

OTHER PUBLICATIONS

Bellanger et al., "The FLS–QR Algorithm for Adaptive Filtering: The Case of Multichannel Signals", Signal Processing, No. 22, 1991, pp. 115–126.
Bellanger, "The FLS–OR Algorithm for Adaptive Filtering", Signal Procesing, Elsevier Science Publishers, B. V., vol. 17, No. 4, Aug. 1989, pp. 291–304.
Bellanger, "Computational Complexity and Accuracy Issues in Fast Least Squares Algorithms for Adaptive Filtering", Proceedings of the 1988 International Symposium on Circuits & Syst., vol. 3, Jun. 7, 1988, pp. 2635–2639.

Primary Examiner—Edward L. Coles, Sr.
Assistant Examiner—Madeleine Anh-Vinh Nguyen
Attorney, Agent, or Firm—Anne E. Barschall

[57] ABSTRACT

A filter for implementing a least squares method receives samples $x(n+1)$ and produces error signals $e(n+1)$ based on reference signals $y(n+1)$. Filtered samples $\tilde{y}(n+1)$ are available at an output 28. The filtered samples are calculated based on: angle functions $\theta_i$ ($i=1$ to $n$) that form part of rotation matrices; a gain vector $G_N(n+1)$ that is based on the rotation matrices; and the error signals. Because the filtered samples are available the filter is suitable for use in an equalizer in which the reference signal is formed by from the filtered signals, as well as in other applications such as echo cancelers.

10 Claims, 5 Drawing Sheets

FILTER ARRANGEMENT IMPLEMENTING A LEAST SQUARES METHOD UTILIZING ROTATION MATRICES

DESCRIPTION

The present invention relates to a filter arrangement implementing a least squares method comprising especially:

an access for receiving samples x(n+1), evaluation means for evaluating angle functions $\theta_i$ (i=1 to N) forming part of at least one of the rotation matrices, evaluation means for evaluating a gain vector $G_N$ (n+1) on the basis of the rotation matrices, processor means for processing reference samples y(n+1), evaluation means tier evaluating an error signal e(n+1) in cooperation with processor means for processing the reference sample.

Such an arrangement may find significant applications in the field of signal processing, especially: for echo cancellers used in data transmission to eliminate multichannel radio communication.

An arrangement of this type is described in the following article published in the journal SIGNAL PROCESSING no. 22, 1991 (ELSEVIER): "The FLS-QR Algorithm for Adaptive Filtering: The Case of Multichannel Signals" by N. G. BELLANGER and P. A. REGALIA.

This known arrangement processes input signals as a function of a reference signal and produces directly a difference signal between a filtered signal and the reference signal without producing the filtered signal. This restricts the application of this arrangement. For example, it is not possible to use this arrangement for equalizers in which the reference signal is formed by means of a threshold circuit influencing the filtered signal.

The present invention proposes an arrangement of the type defined in the opening paragraph to which the filtered signal is made accessible.

Therefore, such an arrangement is characterized in that it further comprises evaluation means for evaluating filtered samples $\tilde{y}(+1)$ recurring as a function of the angles $\theta_i$, of the gain vector and of the error signal.

The following description accompanied by the appended drawings all given by way of non-limiting example will make it better understood how the invention may be realised, in which:

FIG. 1 shows in a block diagram a prior-art filter arrangement;

FIG. 2 also shows in a block diagram a filter arrangement according to the invention, FIG. 3 shows an embodiment for a filter arrangement according to the invention, FIGS. 4 and 5 represent operation flow charts of a first embodiment of the invention;

Figure 1:
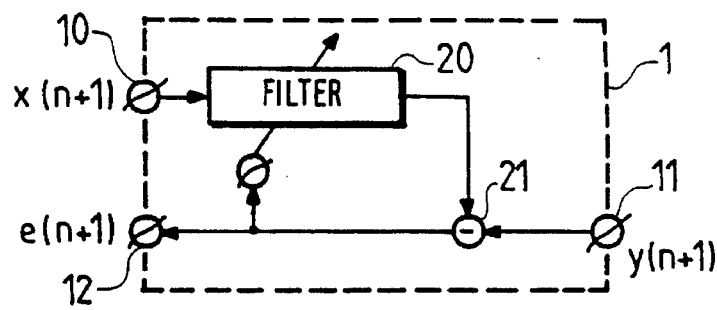

In FIG. 1 is shown a block 1 which performs the operations as described in the prior art. At an access 10 the samples to be filtered x(n+1) are received, at an access 11 reference samples y(n+1) and at an access 12 an error signal e(n+1). For clarity this block has only been shown to comprise a filter section 20 and a difference element 21. However, the point has to be stressed that according to the prior art there are no signals available at the output of the filter section 20.

One may recollect in the following the functions of the prior-art arrangements:

a) a first stage is defined by the following matrix:

$$\begin{bmatrix} e_q(n+1) \\ X_q(n+1) \end{bmatrix} = Q_a(n) \begin{bmatrix} x(n+1) \\ W^{1/2}X_q(n) \end{bmatrix} \quad (1)$$

where $e_q$(n+1) is the transform of error signal e(n+1) which is an indicator of its significance, $X_q$(n+1) is a vector having N components $X_{q;i}$ (i=1,...,N)

W is an omission factor, so that 0<<W<1

$Q_a$ is a matrix derived from a matrix $\hat{Q}_N$(n+1):

$$\hat{Q}_N(n+1) = \begin{bmatrix} \cos\theta_N & -\sin\theta_N & 0 & \ldots & 0 \\ \sin\theta_N & \cos\theta_N & 0 & \ldots & 0 \\ 0 & 0 & 1 & \ldots & 0 \\ \vdots & & & & \\ 0 & \cdot & & \cdot & 1 \end{bmatrix} \ldots \begin{bmatrix} \cos\theta_1 & \ldots & 0 & \ldots & -\sin\theta_1 \\ \cdot & & & & \\ \cdot & & & & \\ 0 & \ldots & 1 & \ldots & 0 \\ \cdot & & & & \\ \cdot & & & & \\ \sin\theta_1 & \ldots & 0 & \ldots & \cos\theta_1 \end{bmatrix} \quad (2)$$

$Q_a$ is obtained on the basis of this matrix $\hat{Q}_N$(n+1) by suppressing rows and columns containing "0" and "1".

b) a second stage consists of calculating:

$$E_a(n+1) = WE_a(n) + e_q^2(n+1)$$

where $E_a$ represents the energy of the error signal $e_{aq}$.

c) a third stage consists of determining the elements of a rotation matrix $Q_\alpha$(n+1):

$$Q_a(n+1) = \begin{bmatrix} \cos\alpha_N & \ldots & 0 & \ldots & -\sin\alpha_N \\ \cdot & & & & \\ \cdot & & & & \\ 0 & \ldots & 1 & \ldots & 0 \\ \cdot & & & & \\ \cdot & & & & \\ \sin\alpha_N & \ldots & 0 & \ldots & \cos\alpha_N \end{bmatrix} \ldots \begin{bmatrix} 1 & \ldots & 0 & \ldots & \\ \cdot & & & & \\ \cdot & & & & \\ \cdot & & & & \\ 0 & \ldots & \cos\alpha_N & -\sin\alpha_N \\ 0 & \ldots & \sin\alpha_N & \cos\alpha_N \end{bmatrix} \quad (3)$$

on the basis of the relation:

$$\sin\alpha_i = \frac{x_{q;i}}{\sqrt{x_{q;i}^2 + \sum_{k=1}^{i-1} x_{q;k}^2 + E_a(n+1)}} \quad (4)$$

from which the value $\cos\alpha_i$ can be derived.

d) a fourth stage consists of calculating:

$$\alpha_2 = y_N(n) e_q(n+1)/E_a^{1/2}(n+1) \quad (5)$$

e) a fifth stage consists of determining a gain vector $G_N(n+1)$ formed by N components $g_1, \ldots, g_N(n+1)$:

$$\begin{bmatrix} \alpha_1 \\ G_N(n+1) \end{bmatrix} = Q_a(n+1) \begin{bmatrix} G_N(n) \\ \alpha_2 \end{bmatrix} \quad (6)$$

f) a sixth stage consists of updating the matrix $Q_a(n)$ or $Q_a(n+1)$ by calculating:

$$\begin{cases} \sin\theta_i = g_{N-i}(n+1)/\gamma_i(n+1) \\ \gamma_{i+1} = \gamma_i \cos\theta_i \end{cases} \quad (7)$$

Figure 2:
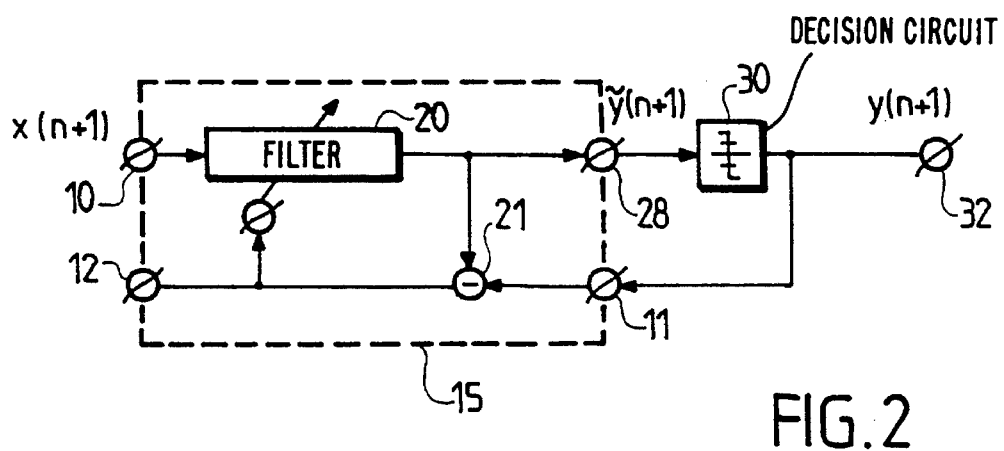

According to the invention evaluation means are provided to evaluate the quantity $\tilde{y}(n+1)$. This quantity is explained with reference to FIG. 2. The elements used both in FIG. 1 and FIG. 2 carry the same references.

This signal $\tilde{y}(n+1)$ appearing at an access 28 may be considered the result of a filtering carried out by a transversal filter:

$$\tilde{y}(n+1) = \sum_{k=0}^{N-1} h_i(n+1) x(n+1-k) \quad (8)$$

where $h_i(n+1)$ are the coefficients of this filter considered at instant n+1.

This signal $\tilde{y}(n+1)$ may be applied to a decision circuit 30 which produces at an access 32 a value $y(n+1)$ which is used as a reference signal for the calculation of the error signal $e(n+1)$ carried out by the difference element 21. For forming the estimate $\tilde{y}(n+1)$ the arrangement comprises means for carrying out additional steps.

A first additional step is formed by the following iterations:

$$\lfloor y_{q;N}'(n+1) \rfloor \lfloor \cos\theta_N \lfloor \sin\theta_N \quad 1 \rfloor \lfloor W^{1/2} y_{q;N}(n) \rfloor \quad (9)$$

$$\vdots$$

$$\begin{bmatrix} U_{i-1} \\ y_{q;i}'(n+1) \end{bmatrix} = \frac{1}{\cos\theta_i} \begin{bmatrix} 1 & \sin\theta_i \\ \sin\theta_i & 1 \end{bmatrix} \begin{bmatrix} U_i \\ W^{1/2} y_{q;i}(n) \end{bmatrix}$$

$$\vdots$$

$$\begin{bmatrix} \tilde{y}(n+1) \\ y_{q;1}'(n+1) \end{bmatrix} = \frac{1}{\cos\theta_1} \begin{bmatrix} 1 & \sin\theta_1 \\ \sin\theta_1 & 1 \end{bmatrix} \begin{bmatrix} U_1 \\ W^{1/2} y_{q;1}(n) \end{bmatrix}$$

and a second additional step:

$$[Y_q(n+1)] = [Y_q'(n+1) + e(n+1) G(n+1)] \quad (10)$$

These additional steps have been carried out on the basis of the following considerations:

One will recollect the following relation given by the prior art (see Filter Section of Table I on page 118 of said article):

$$\begin{bmatrix} e_q(n+1) \\ Y_q(n+1) \end{bmatrix} = Q_a(n+1) \begin{bmatrix} y(n+1) \\ W^{1/2} Y_q(n) \end{bmatrix} \quad (11)$$

where $Y_q$ is a vector having components $Y_{q;1}, \ldots Y_{q;N}$.

If one substitutes in this relation $y(n+1)$ for $\tilde{y}(n+1)$, this will result in that the error signal $e(n+1)$ is forced to zero and its transform $e_q(n+1)=0$.

$$\begin{bmatrix} 0 \\ Y_q'(n+1) \end{bmatrix} = Q_a(n+1) \begin{bmatrix} \tilde{y}(n+1) \\ W^{1/2} Y_q(n) \end{bmatrix} \quad (12)$$

where $Y'_q$ is a vector having components $Y'_{q;1}, \ldots, Y'_{q;N}$.

As the vector on the right is different from that of the previous formula, the vector $Y_q(n+1)$ is to be substituted for $Y'_{q(n+1)}$.

From said relation one may extract the following system by utilizing the structure of the mantrix $Q_a(n+1)$, $$\begin{bmatrix} 0 \\ y_{q;N}' \end{bmatrix} = \begin{bmatrix} \cos\theta_N & -\sin\theta_N \\ \sin\theta_N & \cos\theta_N \end{bmatrix} \begin{bmatrix} U_{N-1} \\ W^{1/2} y_{q;N}(n) \end{bmatrix} \quad (13)$$

by making an auxiliary component $U_{N-1}$ appear, which may adopt the form of:

$$\begin{bmatrix} U_{N-1} \\ y_{q;N}'(n+1) \end{bmatrix} = \frac{1}{\cos\theta_N} \begin{bmatrix} 1 & \sin\theta_N \\ \sin\theta_N & 1 \end{bmatrix} \begin{bmatrix} 0 \\ W^{1/2} y_{q;N}(n) \end{bmatrix} \quad (14)$$

Similarly, there may be written:

$$\begin{bmatrix} U_{i-1} \\ y_{q;i}'(n+1) \end{bmatrix} = \frac{1}{\cos\theta_i} \begin{bmatrix} 1 & \sin\theta_i \\ \sin\theta_i & 1 \end{bmatrix} \begin{bmatrix} U_i \\ W^{1/2} y_{q;i}(n) \end{bmatrix} \quad (15)$$

and by re-using the iteration:

$$\begin{bmatrix} \tilde{y}(n+1) \\ y_{q;1}'(n+1) \end{bmatrix} = \frac{1}{\cos\theta_1} \begin{bmatrix} 1 & \sin\theta_1 \\ \sin\theta_1 & 1 \end{bmatrix} \begin{bmatrix} U_1 \\ W^{1/2} y_{q;1}(n) \end{bmatrix} \quad (16)$$

one may write the relation (11):

$$\begin{bmatrix} e_q(n+1) \\ Y_q(n+1) \end{bmatrix} = Q_a(n+1) \begin{bmatrix} \tilde{y}(n+1) + e(n+1) \\ W^{1/2} Y_q(n) \end{bmatrix} \quad (17)$$

and taking account of (12):

$$\begin{bmatrix} e_q(n+1) \\ Y_q(n+1) \end{bmatrix} = \begin{bmatrix} 0 \\ Y_q'(n+1) \end{bmatrix} + Q_a(n+1) \begin{bmatrix} e(n+1) \\ 0 \end{bmatrix} \quad (18)$$

One knows that (see Table I of said reference):

$$\begin{bmatrix} \gamma_N(n+1) \\ G_N(n+1) \end{bmatrix} = Q_a(n+1) \begin{bmatrix} 1 \\ 0 \\ \vdots \end{bmatrix} \quad (19)$$

One derives therefrom:

$$e_q(n+1) = \gamma_N(n+1)e(n+1) \quad (20)$$

$$Y_q(n+1) = Y'_q(n+1) + G_N(n+1)e(n+1) \quad (21)$$

Figure 3:
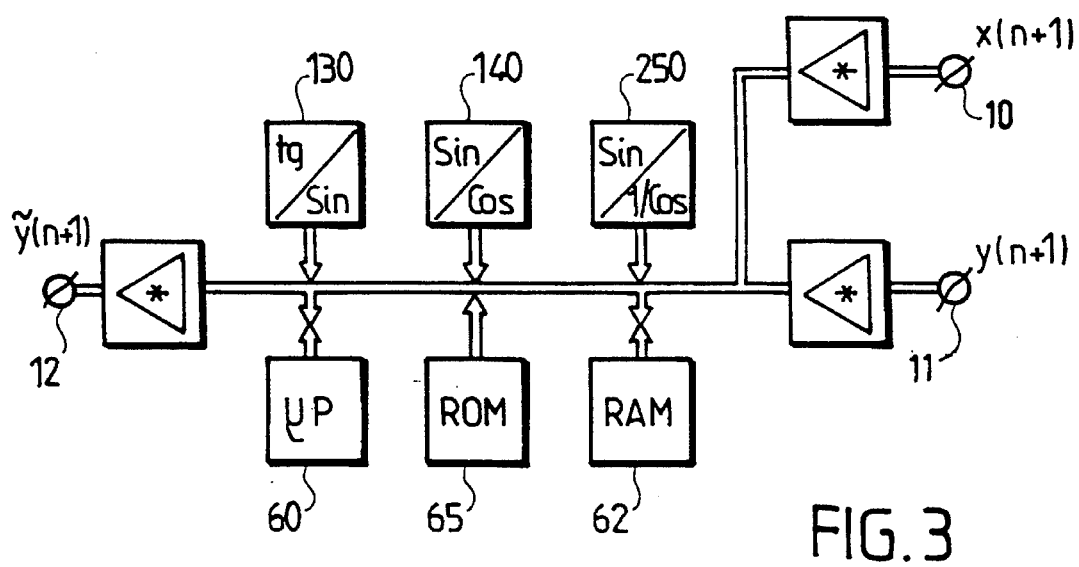

The means described may advantageously be realised by using the arrangement shown in FIG. 3. This arrangement is formed from a signal processor, for example, of the TMS 320 type, carrying reference numeral 60 in this Figure; in the neighbourhood of this processor is a RAM memory unit referenced 62 containing data, and a ROM memory 65 especially containing the running program. The accesses for $x(n+1)$, $y(n+1)$ and $\tilde{y}(n+1)$ carry the same reference characters.

It will be evident that the decision element 40 may also be realised via a running sub-routine. A Table of sinusoidal values 130 which gives, for example, a sinusoidal value based on a tangential value is provided. It is evident that this Table containing values in a read-only memory can be incorporated in the read-only memory 65.

There is also provided a second Table of sinusoidal values 140 which gives a cosine value as a function of a sine value. The observations made hereinbefore with regard to memory 130 apply here too.

Finally, a third Table of sinusoidal values 250 is provided, which gives an inverse cosine value as a function of a sine value.

Figure 4:
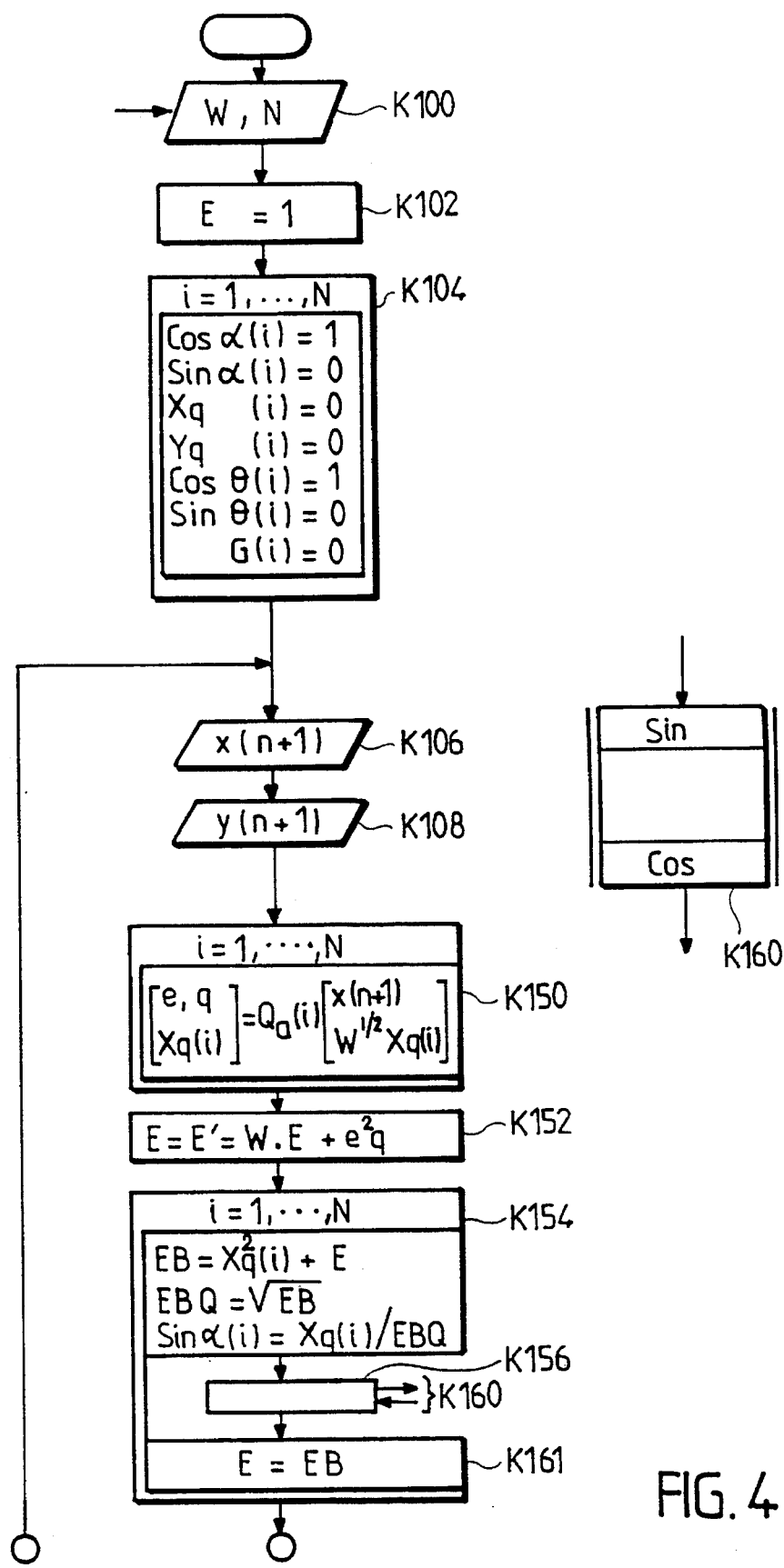
Figure 5:
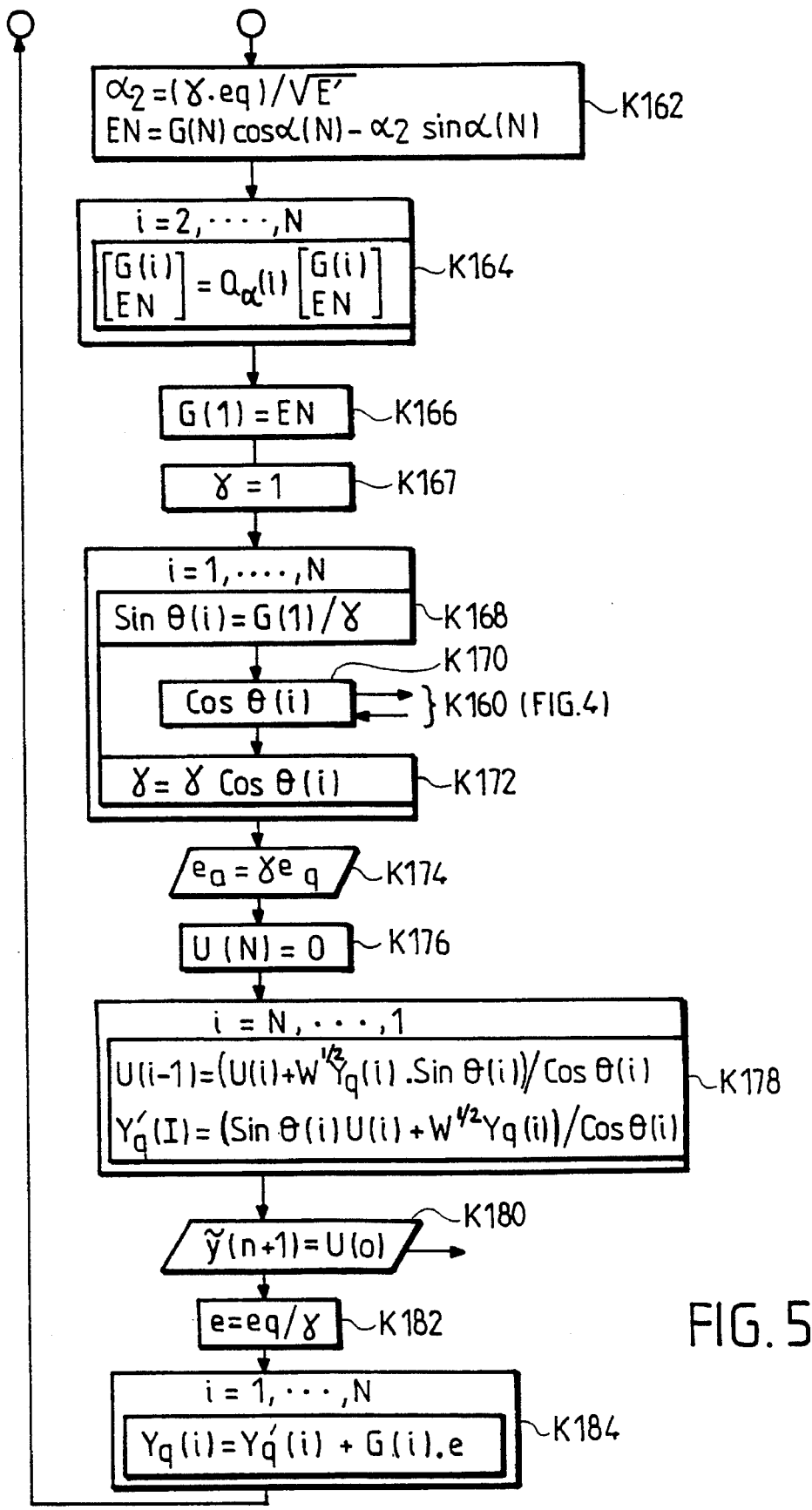

The operation of the arrangement is determined by a program stored in the ROM memory 65. This operation is explained with the aid of FIGS. 4 and 5.

This flow chart begins with a box K100 where the values of N (filter order) and W (weight factor) are entered. The value E is preset at 1 in box K102. Box K104 indicates a presetting of various values indexed with i which varies from 1 to N; the cosine value of the angles $\theta_1$ and $\alpha_1$ is set to 1, whereas their sine value is set to 0; the values $X_q(i)$ and $Y_q(i)$, which form components of vectors $X_q$ and $Y_q$, are also set to 0. The boxes K106 and K108 represent the values of $x(n+1)$ and $y(n+1)$ respectively, which are read through the accesses 10 and 11. Box K150 indicates the calculation of $e_q$ and $X_q(i)$ according to formula (1). This formula may also be explained in the following manner based on the standards of the FORTRAN language.

$$\begin{array}{lll} es & = & x(n+1) \\ DO\ I & = & 1,N \\ e_q & = & es \\ es & = & e_q \cdot \cos\theta(I) - W^{1/2} \cdot \sin\theta(I) \\ X_q(I) & = & e_q \cdot \sin\theta(I) + W^{1/2} \cdot \cos\theta(I) \\ \text{CONTINUE} & & \end{array}$$

Before starting another process, the variables E and E' are preset at the values indicated in box K152. This other processing shown in box K154 consists of determining the sine value of the different angles $\alpha(I)$ by evaluating the given quantities in formula (4). By calling Table 140 in box K156 (the addressing process of this Table is represented by FIG. K160), the value of the associated cosine is obtained. The box K161 produces the value E which will be used in the next iteration of the formula. Then, in box K162, FIG. 5, the quantity given by the formula (5) is determined; in box K164 the N values of the components of $G_N(n+1)$ indicated by the formula (6) are evaluated.

This formula may be explained by:

$$\begin{array}{lll} DO\ I & = & 2,N \\ G(N+2-I) & = & G(N+1-I) \cdot \cos\alpha(N+1-I) - \\ & & EN \cdot \sin\alpha(N+1-I) \\ EN1 & = & G(N+1-I) \cdot \sin\alpha(N+1-I) - \\ & & EN \cdot \cos\alpha(N+1-I) \\ EN & = & EN1 \\ \text{CONTINUE} & & \end{array}$$

Box K166 gives the precise value of G(1), then in box K167 the value of $\gamma$ is preset. The boxes K168, K170 and K172 represent the updating of the matrix $Q_a(n+1)$. Box K170 should be noted which gives the value of the cosine by calling, the sine value of the Table being shown in box K160.

The value of $\gamma$ is then used for producing the value $e(n+1)$, box K174.

In box K176 a variable is preset written as $U(N)=0$ for an evaluation of the various relations (14), (15) (16), box K178.

In Box K180 the value $\tilde{y}(n+1)$ can be produced at access 32.

In box 182 the value $e$ is evaluated, formula (21), and in box K184 the vector $Y_q$ is updated, formula (20).

Figure 6:
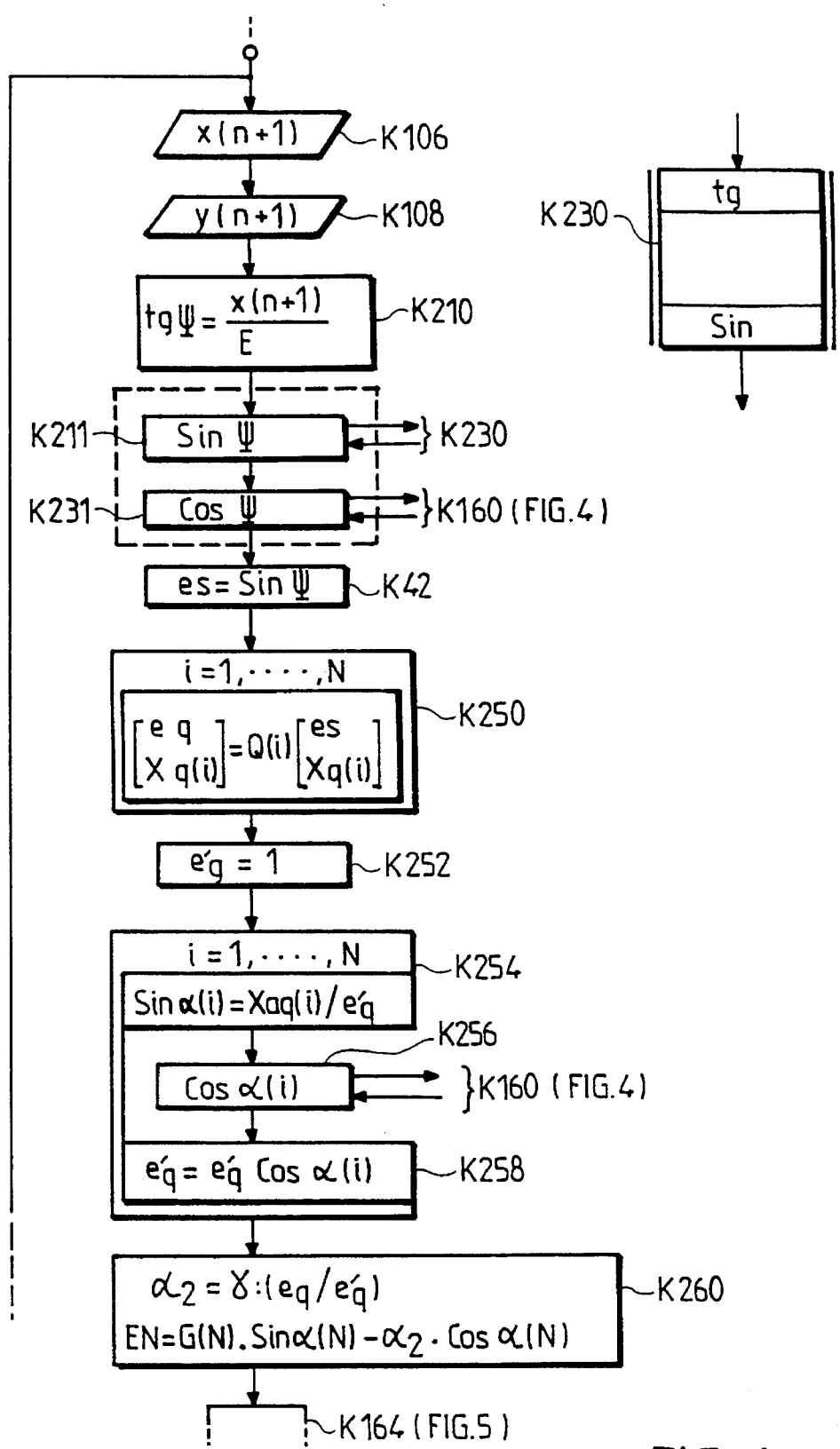
FIG. 6 is an operation flow chart of a second embodiment of the invention.
Figure 7:
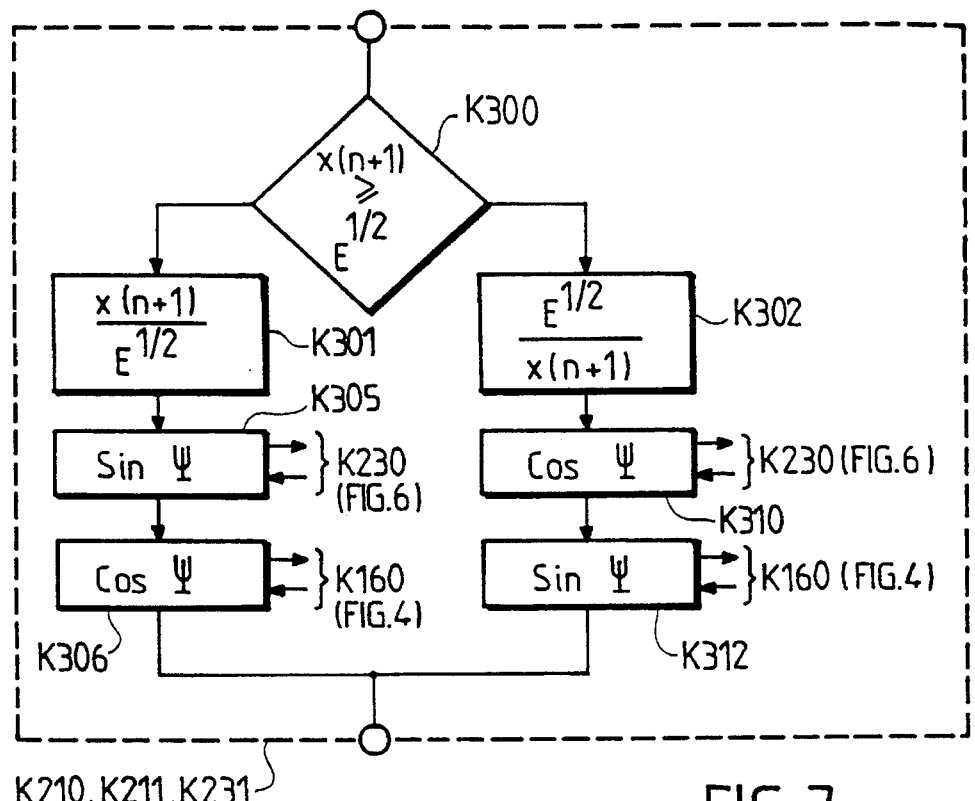
FIG. 7 is an operation flow chart of a third embodiment of the invention.

FIG. 7 shows a variant of the embodiment in which a normalization stage is provided—see FIG. 6.

In this respect one could also consult French Patent Specification No. 91 14 586 filed 26 Nov. 1991. This normalization stage takes place in box K210 which comes after box K108. This phase starts with the calculation of the quotient of the sample value of the value of the square root of E, which gives the tangential value of an angle $\psi$. With reference to the Table 130 the value of $\sin\psi$ is obtained which is indicated in box K211 and the operation carried out by the Table is denoted by K230. To obtain the cosine value, the Table 140 is referred to which is indicated in box K231 and the operation of the Table 140 is indicated by the box K160 (compare FIG. 4). Then, in box K42 a variable auxiliary "es" is utilized which adopts the value $\sin\psi$. Box K250 indicates the calculation of $e_q$ and of $X_{q(i)}$ explained in the following manner, based on the standards of the FORTRAN language.

$$\begin{array}{lll} DO\ I & = & 1,N \\ e_q & = & es \\ es & = & e_q \cdot \cos\theta(i) - \cos\psi \cdot X_q(I) \cdot \sin\theta(I) \\ X_q(I) & = & e_q \cdot \sin\theta(i) + \cos\psi \cdot X_q(I) \cdot \cos\theta(I) \\ \text{CONTINUE} & & \end{array}$$

Before starting another process, a variable $e'_q$ is preset at 1, box K252. This other process shown in box K254 consists of determining the sine value of the various angles $\alpha(i)$ by evaluating the indicated quantifies. By calling Table 140, box K256, the value of the associated cosine is obtained. The box K258 gives the value $e'_q$, the value $E_a^{1/2}(n+1)$ of the formula. Then, in box K260, the quantifies $\alpha 2$ and EN modified by the normalizing stage are determined. The stages that follow are those indicated in FIGS. 5 and 6 starting with box K164.

According to another embodiment the size of the Table 130 can be limited. This variant replaces the boxes K210, K211 and K231 in the flow chart of FIG. 6. The box K300 is a test of $x(n+1)$ relative to $E^{1/2}$, so that a division is made, boxes K301, K302, of which the result is to be less than "1". If the operation of box K301 is carried out, the value tg $\psi$ is obtained and the value of the sines and cosines (K305 and K306), the rest of the operations is identical with those of FIG. 6. If the operation of box K302 is carried out, the value 1/tg $\psi$ is obtained; to obtain the cosine value (K310) of this angle the Table K160 is accessed and to obtain the sine value CK312) the Table K230 is accessed.

Figure 8:
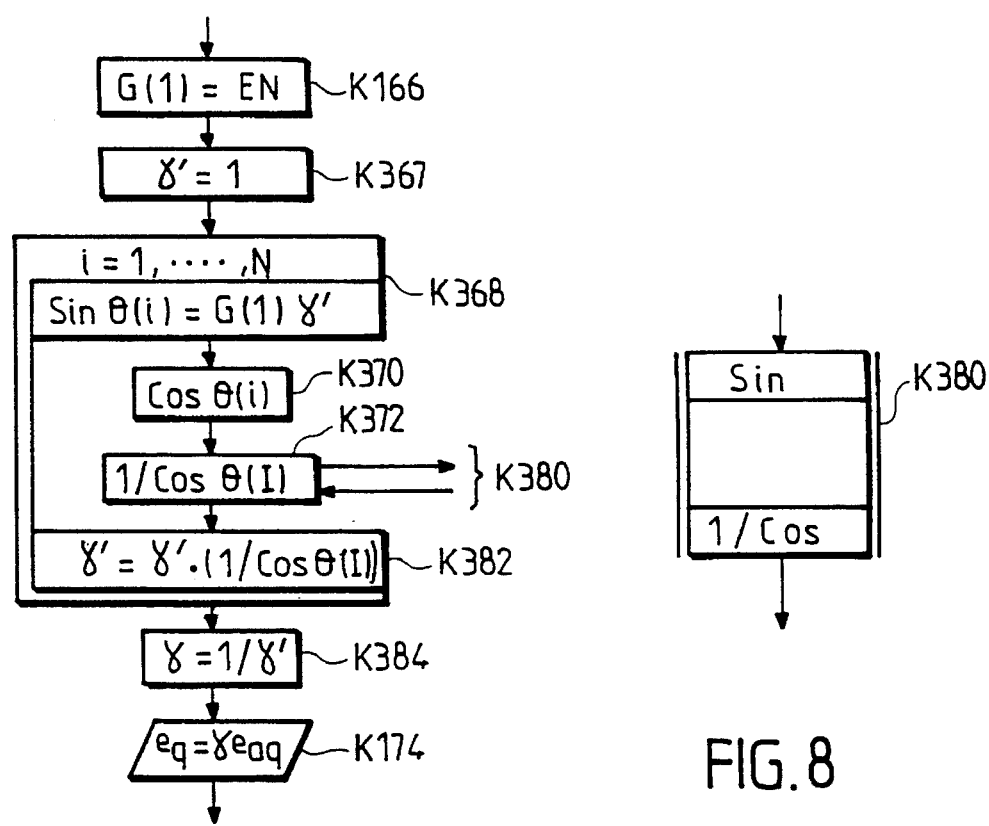
FIG. 8 is an operation flow chart of a fourth embodiment of the invention.

FIG. 8 shows how the matrix $Q_a$ can be updated by avoiding divisions. This part of the flow chart replaces the part of the flow chart of FIG. 5, situated between the boxes K166 and K174. The box K367 indicates the presetting of a parameter $\gamma'$. Then box K368 indicates how the sine values of the angle $\theta$ are determined, box K370 is a calling of Table K160 for storing the various cosine values of this angle, then, in box K372, another Table K380 (memory 250, FIG. 3) is called, which produces the inverse cosine value as a function of the sine value. In box K382 the coefficient $\gamma'$ is determined. At the end of the iteration the value $\gamma$ is restored and the observation is made that these values are each other's inverses (box K384). Thus the following substitutions have been made:

$$\left. \begin{array}{c} \gamma = \gamma' \rightarrow \frac{1}{\gamma} \\ \cos\theta_i \rightarrow \frac{1}{\cos\theta_i} \end{array} \right\} \quad (22)$$

Then, the presence of these Tables has provided that a large number of divisions have been suppressed and no square root extraction is necessary.

I claim:

1. Filter arrangement implementing a least squares method comprising input means for receiving samples $x(n+1)$, evaluation means for evaluating angle functions $\theta_i = (i=1$ to $N)$, which angle functions form part of at least one of a plurality of rotation matrices, evaluation means for evaluating a gain vector $G_N(n+1)$ based on the rotation matrices, processor means for processing reference samples $Y(n+1)$, evaluation means for evaluating an error signal $e(n+1)$ in cooperation with the processor means, means for evaluating filtered samples $\tilde{y}(n+1)$ recurring as a function of the angles $\theta_i$, of the gain vector, and of the error signal, whereby the filtered samples are accessible, wherein n, i, and N are integers.

2. Filter arrangement as claimed in claim 1, characterized in that it comprises a Table for producing the sine/cosine value of an angle as a function of its cosine/sine value.

3. Digital transmission system comprising a transmitter connected to a receiver by a transmission channel, this receiver comprising a filter arrangement implementing a least squares method comprising input means for receiving samples $x(n+1)$, evaluation means for evaluating angle functions $\theta_i = (i=1$ to $N)$, which angle functions form part of at least one of plurality of rotation matrices, evaluation means for evaluating a gain vector $G_N(n+1)$ based on the rotation matrices, processor means for processing reference samples $y(n+1)$, evaluation means for evaluating an error signal $e(n+1)$ in cooperation with the processor means, means for evaluating filtered samples $\tilde{y}(n+1)$ recurring as a function of the angles $\theta_i$, of the gain vector, and of the error signal, whereby the filtered samples are accessible, and a decision element for deriving the reference samples from the filtered samples, where n, i, and N are integers.

4. A digital filter for implementing a least squares calculating comprising input means for receiving signals $x(n+1)$;

input means for receiving reference signals $y(n+1)$;

output means for supplying error signals $e(n+1)$;

processing means for calculating a plurality of matrices at least one of which includes angle functions $\theta_i$ (i=1 to N);

a gain vector $G_N(n+1)$ based on the rotation matrices;

the error signals $e(n+1)$, based on the reference signals;

filtered signals $\tilde{y}(n+1)$ as a function of the angles $\theta_i$, the gain vector $G_N(n+1)$, and of the error signals $e(n+1)$;

output means for supplying the filtered signals $\tilde{y}(n+1)$.

5. Filter arrangement as claimed in claim 4, wherein the processing means evaluates the following:

$$\begin{bmatrix} U_{N-1} \\ y_{q;N}'(n+1) \end{bmatrix} = \frac{1}{\cos\theta_N} \begin{bmatrix} 1 & \sin\theta_N \\ \sin\theta_N & 1 \end{bmatrix} \begin{bmatrix} 0 \\ W^{1/2}y_{q;N}(n) \end{bmatrix} \quad (14)$$

$$\begin{bmatrix} U_{i-1} \\ y_{q;i}'(n+1) \end{bmatrix} = \frac{1}{\cos\theta_i} \begin{bmatrix} 1 & \sin\theta_i \\ \sin\theta_i & 1 \end{bmatrix} \begin{bmatrix} U_i \\ W^{1/2}y_{q;i}(n) \end{bmatrix} \quad (15)$$

$$\begin{bmatrix} \tilde{y}(n+1) \\ y_{q;1}'(n+1) \end{bmatrix} = \frac{1}{\cos\theta_1} \begin{bmatrix} 1 & \sin\theta_1 \\ \sin\theta_1 & 1 \end{bmatrix} \begin{bmatrix} U_1 \\ W^{1/2}y_{q;1}(n) \end{bmatrix} \quad (16)$$

$$Y_q(n+1) = [Y_q'(n+1) + e(n+1) \cdot G(n+1)]$$

where

W is an omission factor such that $0<<W<1$ $Y'_{q;1}(n+1)$, $Y'_{q;i}(n+1)$, and $Y'_{q;N}(n+1)$ are all components of a vector $Y'_q(n+1)$ $Y_{q;1}(n+1)$, $Y_{q;i}(n+1)$, $Y_{q;n}(m+1)$ are all components of a vector $Y_q(n+1)$.

6. Filter arrangement as claimed in claim 5, characterized in that the samples $x(n+1)$ are normalized relative to their power, according to the following equation:

$$\begin{bmatrix} 0 \\ E^{1/2}(n+1) \end{bmatrix} = \begin{bmatrix} \cos\psi & -\sin\psi \\ \sin\psi & \cos\psi \end{bmatrix} \begin{bmatrix} x(n+1) \\ W^{1/2}E^{1/2}(n) \end{bmatrix}$$

where represents the energy of the error signal $\psi$ is the angle whose tangent is the square root of E.

7. Filter arrangement as claimed in claim 6, characterized in that for effecting this normalization it comprises a Table for producing a sin/cos value of an angle as function of its tg/cotg value.

8. A digital transmission system comprising a transmitter and a receiver which includes the filter of claim 4.

9. The filter of claim 4 wherein the processing means comprises look-up table means for supplying trigonometric function values.

10. The filter of claim 4 further comprising means, coupled between the output means for supplying the filtered signals and the input means for receiving the reference signals, for deriving the reference signals from the filtered signals.

* * * * *